US010000409B2

(12) United States Patent
Ellison et al.

(10) Patent No.: US 10,000,409 B2
(45) Date of Patent: *Jun. 19, 2018

(54) ALKALI-DOPED AND ALKALI-FREE BOROALUMINOSILICATE GLASS

(71) Applicant: CORNING INCORPORATED, Corning, NY (US)

(72) Inventors: Adam James Ellison, Corning, NY (US); Jason Sanger Frackenpohl, Corning, NY (US); John Christopher Mauro, Corning, NY (US); Douglas Miles Noni, Jr., Horseheads, NY (US); Natesan Venkataraman, Painted Post, NY (US)

(73) Assignee: CORNING INCORPORATED, Corning, NY (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/478,571

(22) Filed: Apr. 4, 2017

(65) Prior Publication Data

US 2017/0291845 A1    Oct. 12, 2017

Related U.S. Application Data

(62) Division of application No. 14/455,332, filed on Aug. 8, 2014, now Pat. No. 9,643,884.

(60) Provisional application No. 61/866,272, filed on Aug. 15, 2013.

(51) Int. Cl.
*B32B 17/06* (2006.01)
*C03C 3/091* (2006.01)
(Continued)

(52) U.S. Cl.
CPC .............. *C03C 3/118* (2013.01); *B32B 17/06* (2013.01); *C03B 17/02* (2013.01); *C03C 3/093* (2013.01);
(Continued)

(58) Field of Classification Search
CPC ......... C03C 3/091; C03C 3/093; B32B 17/06; B32B 17/064
See application file for complete search history.

(56) References Cited

U.S. PATENT DOCUMENTS 6,319,867 B1    11/2001   Chacon et al.
6,992,030 B2    1/2006    Paulson
(Continued)

FOREIGN PATENT DOCUMENTS

| JP | 2001151534 | 3/2011 |
| WO | 8902877 | 4/1989 |
| WO | 2013130718 | 9/2013 |

OTHER PUBLICATIONS

"Mauro, ""Statistics of Modifier Distributions in Mixed Network Glasses,"" J. Chem. Phys. 138,12A522 (2013)."
PCT/US2014/050279 Search report dated Oct. 29, 2014—Cited as EP Search Report.

*Primary Examiner* — Karl E Group
(74) *Attorney, Agent, or Firm* — Kevin M. Johnson

(57) ABSTRACT

Alkali-doped boroaluminosilicate glasses are provided. The glasses include the network formers $SiO_2$, $B_2O_3$, and $Al_2O_3$. The glass may, in some embodiments, have a Young's modulus of less than about 65 GPa and/or a coefficient of thermal expansion of less than about $40 \times 10^{-7}/°$ C. The glass may be used as a cover glass for electronic devices, a color filter substrate, a thin film transistor substrate, or an outer clad layer for a glass laminate.

20 Claims, 2 Drawing Sheets

(51) Int. Cl.
*C03B 17/06* (2006.01)
*C03C 3/118* (2006.01)
*C03C 3/093* (2006.01)
*C03C 3/095* (2006.01)
*C03C 3/11* (2006.01)
*C03B 17/02* (2006.01)

(52) U.S. Cl.
CPC ................ *C03C 3/095* (2013.01); *C03C 3/11* (2013.01); *C03B 17/064* (2013.01)

(56) References Cited

U.S. PATENT DOCUMENTS

| | | |
|---|---|---|
| 7,534,734 B2 | 5/2009 | Ellison |
| 7,763,559 B2 | 7/2010 | Kurachi et al. |
| 8,007,913 B2 | 8/2011 | Coppola et al. |
| 8,796,165 B2 | 8/2014 | Ellison et al. |
| 8,835,335 B2 | 9/2014 | Murata et al. |
| 9,023,421 B2 | 5/2015 | Nakashima |
| 2007/0190340 A1 | 8/2007 | Coppola et al. |
| 2010/0292068 A1 | 11/2010 | Takaya et al. |
| 2011/0318561 A1 | 12/2011 | Murata et al. |
| 2012/0135852 A1 | 5/2012 | Ellison et al. |
| 2012/0135853 A1 | 5/2012 | Amin et al. |
| 2012/0141668 A1 | 6/2012 | Nakashima |
| 2012/0308803 A1 | 12/2012 | Dejneka et al. |
| 2014/0242375 A1 | 8/2014 | Mauro et al. |
| 2014/0342897 A1 | 11/2014 | Amin et al. |
| 2015/0037553 A1 | 2/2015 | Mauro |
| 2015/0140299 A1 | 5/2015 | Ellison et al. |

ALKALI-DOPED AND ALKALI-FREE BOROALUMINOSILICATE GLASS

This application is a divisional application of U.S. application Ser. No. 14/455,332, filed on Aug. 8, 2014, now issued as U.S. Pat. No. 9,643,884, which claims the benefit of priority under 35 U.S.C. § 119 of U.S. Provisional Application Ser. No. 61/866,272, filed on Aug. 15, 2013, the content of which is relied upon and incorporated herein by reference in its entirety.

BACKGROUND

The disclosure relates to glasses that do not contain alkali metals or their oxides. More particularly, the disclosure relates to glasses that either contain low levels of alkali metals and/or alkali metal oxides or are alkali-doped and alkali-free and are formable by down-draw processes such as slot-draw and fusion-draw techniques. Even more particularly, the disclosure relates to glasses that either contain low levels of alkali metals and/or alkali metal oxides or are alkali-doped and alkali-free and can be formed into a clad layer for a glass laminate.

SUMMARY

Alkali-doped boroaluminosilicate glasses are provided. The glasses include the network formers $SiO_2$, $B_2O_3$, and $Al_2O_3$. The glass may, in some embodiments, have a Young's modulus of less than about 65 GPa and/or a coefficient of thermal expansion, averaged over a temperature range from about 20° C. to about 300° C., of less than about $40 \times 10^{-7}$/° C. The glass may be used as a cover glass for electronic devices, a color filter substrate, a thin film transistor substrate, or an outer clad layer for a glass laminate.

Accordingly, one aspect of the disclosure is to provide a glass comprising from about 50 mol % to about 70 mol % $SiO_2$; from about 5 mol % to about 20 mol % $Al_2O_3$; from about 12 mol % to about 35 mol % $B_2O_3$; up to about 5 mol % MgO; up to about 12 mol % CaO; and up to about 5 mol % SrO, wherein the sum of alkali metal oxide modifiers is less than or equal to about 1 mol %.

A second aspect of the disclosure is to provide a glass comprising $SiO_2$, $B_2O_3$, and $Al_2O_3$. The sum of alkali metal oxide modifiers in the glass is less than or equal to about 1 mol %. The glass is substantially free of $P_2O_5$, and has at least one of a Young's modulus of less than about 65 GPa, a coefficient of thermal expansion, averaged over a temperature range from about 20° C. to about 300° C., of less than about $40 \times 10^{-7}$/° C., and a Knoop scratch threshold of at least about 15 N (Newtons).

A third aspect of the disclosure is to provide a glass laminate comprising a core glass and a clad glass laminated onto an outer surface of the core glass. The clad glass layer comprises $SiO_2$, $B_2O_3$, and $Al_2O_3$ and the sum of alkali metal oxide modifiers in the clad layer glass is less than or equal to about 1 mol %. The clad glass has a first coefficient of thermal expansion, averaged over a temperature range from about 20° C. to about 300° C., of less than about $40 \times 10^{-7}$/° C. and the core glass has a second coefficient of thermal expansion, averaged over a temperature range from about 20° C. to about 300° C., that is greater than the first coefficient of thermal expansion.

A fourth aspect of the disclosure is to provide a method of making a glass. The method comprises: providing a glass melt, the glass melt comprising $SiO_2$, $B_2O_3$, and $Al_2O_3$, wherein the sum of alkali metal oxide modifiers in the glass is less than or equal to about 1 mol %; and down-drawing the glass melt to form the glass These and other aspects, advantages, and salient features will become apparent from the following detailed description, the accompanying drawings, and the appended claims.

DETAILED DESCRIPTION

Figure 1:
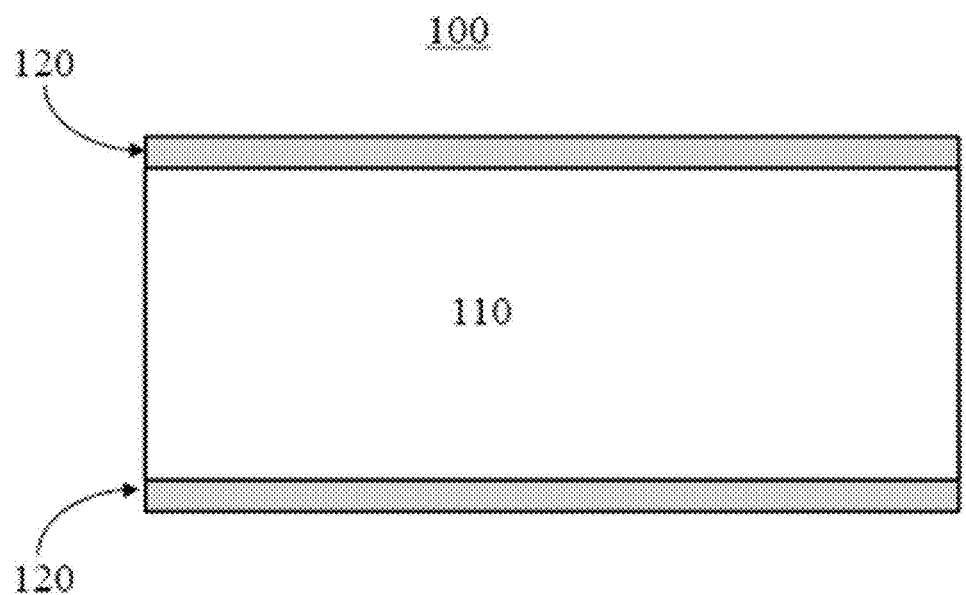
FIG. 1 is a schematic cross-sectional view of a glass laminate.
Figure 2A:
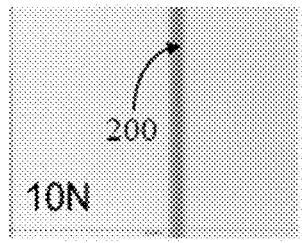
FIGS. 2A, 2B, 2C, 2D, 2E, and 2F are photographs of Knoop scratch test results for a glass sample.
Figure 2B:
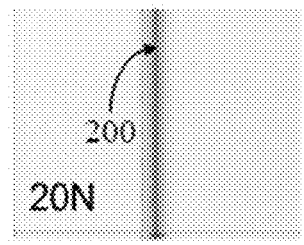
Figure 2C:
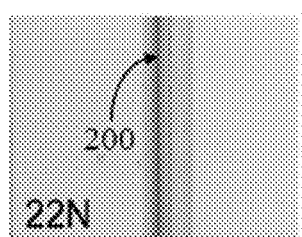
Figure 2D:
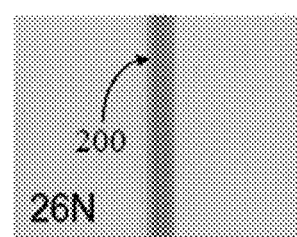
Figure 2E:
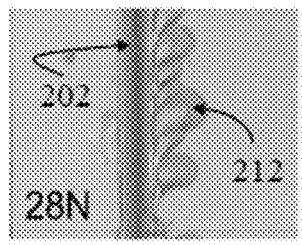
Figure 2F:
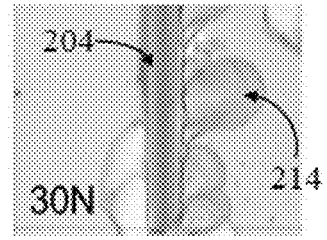

In the following description, like reference characters designate like or corresponding parts throughout the several views shown in the figures. It is also understood that, unless otherwise specified, terms such as "top," "bottom," "outward," "inward," and the like are words of convenience and are not to be construed as limiting terms. In addition, whenever a group is described as comprising at least one of a group of elements and combinations thereof, it is understood that the group may comprise, consist essentially of, or consist of any number of those elements recited, either individually or in combination with each other. Similarly, whenever a group is described as consisting of at least one of a group of elements or combinations thereof, it is understood that the group may consist of any number of those elements recited, either individually or in combination with each other. Unless otherwise specified, a range of values, when recited, includes both the upper and lower limits of the range as well as any ranges therebetween. As used herein, the indefinite articles "a," "an," and the corresponding definite article "the" mean "at least one" or "one or more," unless otherwise specified. It also is understood that the various features disclosed in the specification and the drawings can be used in any and all combinations.

As used herein, the terms "glass article" and "glass articles" are used in their broadest sense to include any object made wholly or partly of glass. Unless otherwise specified, all compositions are expressed in terms of mole percent (mol %). Coefficients of thermal expansion (CTE) are expressed in terms of $10^{-7}$/° C. and represent a value measured over a temperature range from about 20° C. to about 300° C., unless otherwise specified.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue. Thus, a glass that is "substantially free of alkali metal oxides" or "substantially free of $P_2O_5$," is one in which such oxides are not actively added or batched into the glass, but may be present in very small amounts as contaminants.

Referring to the drawings in general and to FIG. 1 in particular, it will be understood that the illustrations are for the purpose of describing particular embodiments and are not intended to limit the disclosure or appended claims thereto. The drawings are not necessarily to scale, and certain features and certain views of the drawings may be shown exaggerated in scale or in schematic in the interest of clarity and conciseness.

Described herein are glasses and glass articles made therefrom that comprise the network formers $SiO_2$, $B_2O_3$, and $Al_2O_3$, and, in some embodiments, have low (i.e., less than about $40 \times 10^{-7}$/° C.) coefficients of thermal expansion (CTE). In some embodiments, the glasses are intentionally lightly doped with less than about 1 mol % of alkali metals or alkali metal oxides to lower the resistivity of the glass melt and avoid "fire-through" of refractory containment and processing structures. In other embodiments, the glasses are free of alkali metals and alkali metal oxides (also referred to herein as "alkali metal oxide modifiers"). In some embodiments, these glasses also have low values of Young's modulus and shear modulus to improve the intrinsic or native damage resistance of the glass.

In some embodiments, the glasses described herein are formable by down-draw processes that are known in the art, such as slot-draw and fusion-draw processes. The fusion draw process is an industrial technique that has been used for the large-scale manufacture of thin glass sheets. Compared to other flat glass manufacturing techniques, such as the float or slot draw processes, the fusion draw process yields thin glass sheets with superior flatness and surface quality. As a result, the fusion draw process has become the dominant manufacturing technique in the fabrication of thin glass substrates for liquid crystal displays, as well as for cover glass for personal electronic devices such as notebooks, entertainment devices, tables, laptops, and the like.

The fusion draw process involves the flow of molten glass over a trough known as an "isopipe," which is typically made of zircon or another refractory material. The molten glass overflows the top of the isopipe from both sides, meeting at the bottom of the isopipe to form a single sheet where only the interior of the final sheet has made direct contact with the isopipe. Since neither exposed surface of the final glass sheet has made contact with the isopipe material during the draw process, both outer surfaces of the glass are of pristine quality and do not require subsequent finishing.

In order to be fusion drawable, a glass must have a sufficiently high liquidus viscosity (i.e., the viscosity of a molten glass at the liquidus temperature). In some embodiments, the glasses described herein have a liquidus viscosity of at least about 100 kilopoise (kpoise), in other embodiments, at least about 120 kpoise, and in still other embodiments, these glasses have a liquidus viscosity of at least about 300 kpoise. In those instances in which the alkali-doped and alkali-free glass is used as a clad layer in a glass laminate and the viscosity behavior of the core glass with respect to temperature is approximately the same as that of the clad glass, the liquidus viscosity of the clad glass may be greater than or equal to about 70 kPoise.

Traditional fusion draw is accomplished using a single isopipe, resulting in a homogeneous glass product. The more complicated laminate fusion process makes use of two isopipes to form a laminated sheet comprising a core glass composition surrounded on either (or both) side by outer clad layers. One of the main advantages of laminate fusion is that when the coefficient of thermal expansion of the clad glass is less than that of the core glass, the CTE difference results in a compressive stress in the outer clad layer. This compressive stress increases the strength of the final glass product without the need for ion exchange treatment. Unlike ion exchange, this strengthening can be achieved without the use of alkali ions in the glass.

Accordingly, in some embodiments, the alkali-doped and alkali-free glasses described herein may be used to form a glass laminate, schematically shown in FIG. 1. Glass laminate 100 comprises a core glass 110 surrounded by a clad glass 120 or "clad layer" formed from the alkali-doped and alkali-free glass described herein. The core glass 110 has a CTE that is greater than that of the alkali-doped and alkali-free glass in the clad layer 120. The core glass may, in some embodiments, be an alkali aluminosilicate glass. In one non-limiting example, the core glass is an alkali alumino-silicate glass having the composition 66.9 mol % $SiO_2$, 10.1 mol % $Al_2O_3$, 0.58 mol % $B_2O_3$, 7.45 mol % $Na_2O$, 8.39 mol % $K_2O$, 5.78 mol % MgO, 0.58 mol % CaO, 0.2 mol % $SnO_2$, 0.01 mol % $ZrO_2$, and 0.01 mol % $Fe_2O_3$, with a strain point of 572° C., an anneal point of 629° C., a softening point of 888° C., and CTE=$95.5 \times 10^{-7}$/° C.

When employed as a clad glass in a laminated product, the alkali-doped and alkali-free glass compositions described herein can provide high compressive stresses to the clad layer. The CTE of low alkali metal oxide/alkali-doped and alkali-free fusion-formable glasses described herein are generally in the range of about $40 \times 10^{-7}$/° C. or less and, in some embodiments, in the range of about $35 \times 10^{-7}$/° C. or less. When such a glass is paired with, for example, an alkali aluminosilicate glass (e.g., Gorilla® Glass, manufactured by Corning Incorporated) having a CTE of $90 \times 10^{-7}$/° C., the expected compressive stress in the clad glass can be calculated using the elastic stress equations given below in which subscripts 1 and 2 refer to the core glass and the clad glass, respectively:

$$\sigma_2 = \frac{E_1(e_2 - e_1)}{\left(\frac{E_1}{E_2}(1 - \nu_2)\right) + \left(\frac{2t_2}{t_1}(1 - \nu_1)\right)}$$

and $$\sigma_1 = -\frac{2t_2}{t_1}\sigma_2$$

where E is Young's modulus, $\upsilon$ is Poisson's ratio, $\tau$ is the glass thickness, $\sigma$ is the stress, and $e_2-e_1$ is the difference in thermal expansion between the clad glass and the core glass. Using the same elastic modulus and Poisson's ratio for the clad glass and core glass further simplifies the above equations.

To calculate the difference in thermal expansion between the clad glass and core glass, it is assumed that the stress sets in below the strain point of the softer glass of the clad and core. The stresses in the clad glass can be estimated using these assumptions and the equations above. For typical display-like glass with a CTE of $30 \times 10^{-7}$/° C. as the clad glass and an alkali aluminosilicate core glass with CTE of $90 \times 10^{-7}$/° C., overall thicknesses in the range of 0.5-1.0 mm and clad glass thickness of 10-100 µm, the compressive stress of the clad glass is estimated to be in a range from about 200 MPa to about 315 MPa. In some embodiments, the glasses described herein have coefficients of thermal expansion of less than about $40 \times 10^{-7}$/° C. and, in some embodiments, less than about $35 \times 10^{-7}$/° C. For these glasses, the compressive stress of the clad glass layer would be at least about 40 MPa, and in other embodiments, at least about 80 MPa.

The alkali-doped and alkali-free glasses described herein have especially low coefficients of thermal expansion. In some embodiments, the CTE of the glass is less than less than about $40 \times 10^{-7}$/° C. and, in other embodiments, is less than about $35 \times 10^{-7}$/° C. When paired with a core glass having a higher CTE, the glasses described herein provide a high level of compressive stress in the clad layers of the final laminated glass product. This increases the strength of the glass laminate product. Room-temperature compressive stresses of at least about 40 MPa and, in some embodiments, at least about 80 MPa are attainable by using the glasses disclosed herein in the clad layer of the laminate. When used as a clad layer, the liquidus viscosity requirements of the glasses described herein may be lowered. In those embodiments where the viscosity behavior of the core glass with respect to temperature is approximately the same as (i.e., "matched with") that of the clad glass, the liquidus viscosity of the clad glass may be greater than or equal to about 70 kPoise.

The alkali-doped and alkali-free glasses have values of Young's modulus and shear modulus that are significantly less than those of other commercially available fusion-drawn glasses. In some embodiments, the Young's modulus is less than about 65 gigapascals (GPa) and, in still other embodiments, less than about 60 GPa. The low elastic moduli provide these glasses with a high level of intrinsic damage resistance.

In some embodiments, the glasses described herein consist essentially of or comprise: from about 50 mol % to about 70 mol % $SiO_2$ (i.e., 50 mol % ≤ $SiO_2$ ≤ 70 mol %); from about 5 mol % to about 20 mol % $Al_2O_3$ (i.e., 5 mol % ≤ $Al_2O_3$ ≤ 20 mol %); from about 12 mol % to about 35 mol % $B_2O_3$ (i.e., 12 mol % ≤ $B_2O_3$ ≤ 35 mol %); up to about 5 mol % MgO (i.e., 0 mol % ≤ MgO ≤ 5 mol %); up to about 12 mol % CaO (i.e., 0 mol % ≤ CaO ≤ 12 mol %); and up to about 5 mol % SrO (i.e., 0 mol % ≤ SrO ≤ 5 mol %), wherein the sum of the alkali metal oxide modifiers is less than or equal to 0.1 mol % (i.e., 0 mol % ≤ $Li_2O+Na_2O+K_2$O ≤ 0.1 mol %). In some embodiments, 4 mol % ≤ MgO+CaO+SrO ≤ $Al_2O_3$+1 mol %. In certain embodiments, the glass is substantially free of, or contains 0 mol %, $P_2O_5$ and/or alkali metal oxide modifiers.

The glass may further include up to about 0.5 mol % $Fe_2O_3$ (i.e., 0 mol % ≤ $Fe_2O_3$ ≤ 0.5 mol %); up to about 0.2 mol % $ZrO_2$ (i.e., 0 mol % ≤ $ZrO_2$ ≤ 0.2 mol %); and, optionally, at least one fining agent such as $SnO_2$, $CeO_2$, $As_2O_3$, $Sb_2O_5$, $Cl^-$, $F^-$, or the like. The at least one fining agent may, in some embodiments, include up to about 0.7 mol % $SnO_2$ (i.e., 0 mol % ≤ $SnO_2$ ≤ 0.5 mol %); up to about 0.7 mol % $CeO_2$ up to about 0.5 mol % (i.e., 0 mol % ≤ $CeO_2$ ≤ 0.7 mol %); $As_2O_3$ (i.e., 0 mol % ≤ $As_2O_3$ ≤ 0.5 mol %); and up to about 0.5 mol % $Sb_2O_3$ (i.e., 0 mol % ≤ $Sb_2O_3$ ≤ 0.5 mol %).

In particular embodiments, the glasses consist essentially of or comprise: from about 55 mol % to about 70 mol % $SiO_2$ (i.e., 55 mol % ≤ $SiO_2$ ≤ 70 mol %); from about 6 mol % to about 10 mol % $Al_2O_3$ (i.e., 6 mol % < $Al_2O_3$ ≤ 10 mol %); from about 18 mol % to about 30 mol % $B_2O_3$ (i.e., 18 mol % ≤ $B_2O_3$ ≤ 30 mol %); up to about 3 mol % MgO (i.e., 0 mol % ≤ MgO ≤ 3 mol %); from about 2 mol % up to about 10 mol % CaO (i.e., 2 mol % ≤ CaO ≤ 10 mol %); and up to about 3 mol % SrO (i.e., 0 mol % ≤ SrO ≤ 3 mol %), wherein the sum of the alkali metal oxide modifiers is less than or equal to 1 mol % (i.e., 0 mol % ≤ $Li_2O+Na_2O+K_2O$ ≤ 1 mol %). In some embodiments, the total amount of MgO, CaO, and SrO in the glasses described herein is greater than or equal to about 4 mol % and less than or equal to the amount of $Al_2O_3$ present in the glass (i.e., 4 mol % ≤ MgO+CaO+SrO ≤ $Al_2O_3$). In some embodiments, the total amount of alkali and alkaline earth oxides in the glasses described herein is greater than or equal to about 4 mol % and less than or equal to the amount of $Al_2O_3$ present in the glass (i.e., 4 mol % ≤ $Li_2O+Na_2O+K_2O$+MgO+CaO+SrO ≤ $Al_2O_3$). In certain embodiments, the glass is free of $P_2O_5$.

The glass may further include up to about 0.2 mol % $ZrO_2$ (i.e., 0 mol % ≤ $ZrO_2$ ≤ 0.2 mol %), up to about 0.2 mol % $Fe_2O_3$ (i.e., 0 mol % ≤ $Fe_2O_3$ ≤ 0.2 mol %) and at least one fining agent such as $SnO_2$, $CeO_2$, $As_2O_3$, $Sb_2O_5$, $Cl^-$, $F^-$, or the like. The at least one fining agent may, in some embodiments, include up to about 0.2 mol % $SnO_2$ (i.e., 0 mol % ≤ $SnO_2$ ≤ 0.2 mol %).

Compositions and of non-limiting examples of these glasses are listed in Table 1. Each of the oxide components of these glasses serves a function. Silica ($SiO_2$) is the primary glass forming oxide, and forms the network backbone for the molten glass. Pure $SiO_2$ has a low CTE and is alkali metal-free. Due to its extremely high melting temperature, however, pure $SiO_2$ is incompatible with the fusion draw process. The viscosity curve is also much too high to match with any core glass in a laminate structure. In some embodiments, the amount of $SiO_2$ in the glasses described herein ranges from about 50 mol % to about 70 mol %. In other embodiments, the $SiO_2$ concentration ranges from about 55 mol % to about 70 mol %.

In addition to silica, the glasses described herein comprise the network formers $Al_2O_3$ and $B_2O_3$ to achieve stable glass formation, low CTE, low Young's modulus, low shear modulus, and to facilitate melting and forming. By mixing all four of these network formers in appropriate concentrations, it is possible achieve stable bulk glass formation while minimizing the need for network modifiers such as alkali or alkaline earth oxides, which act to increase CTE and modulus. Like $SiO_2$, $Al_2O_3$ contributes to the rigidity to the glass network. Alumina can exist in the glass in either fourfold or fivefold coordination. In some embodiments, the glasses described herein comprise from about 5 mol % to about 12 mol % $Al_2O_3$ and, in particular embodiments, from about 6 mol % to about 10 mol % $Al_2O_3$.

Boron oxide ($B_2O_3$) is also a glass-forming oxide that is used to reduce viscosity and thus improves the ability to melt and form glass. $B_2O_3$ can exist in either threefold or fourfold coordination in the glass network. Threefold coordinated $B_2O_3$ is the most effective oxide for reducing the Young's modulus and shear modulus, thus improving the intrinsic damage resistance of the glass. Accordingly, the glasses described herein, in some embodiments, comprise from about 12 mol % up to about 35 mol % $B_2O_3$ and, in other embodiments, from about 18 mol % to about 30 mol % $B_2O_3$.

Alkaline earth oxides (MgO, CaO, and SrO), like $B_2O_3$, also improve the melting behavior of the glass. However, they also act to increase CTE and Young's and shear moduli. In some embodiments, the glasses described herein comprise up to about 5 mol % MgO, up to about 12 mol % CaO, and up to about 5 mol % SrO and, in other embodiments, up to about 3 mol % MgO, from about 2 mol % up to about 10 mol % CaO, and up to about 3 mol % SrO. In order to ensure that the vast majority of $B_2O_3$ in the glass is in the threefold coordinated state and thus obtain a high native scratch resistance, (MgO)+(CaO)+(SrO) ≤ ($Al_2O_3$)+1 mol % in some embodiments, or, in other embodiments, (MgO)+(CaO)+(SrO) ≤ ($Al_2O_3$).

The glass may also include at least one fining agent such as $SnO_2$, $CeO_2$, $As_2O_3$, $Sb_2O_5$, $Cl^-$, $F^-$, or the like in small concentrations to aid in the elimination of gaseous inclusions during melting. In some embodiments, the glass may comprise up to about 0.7 mol % $SnO_2$, up to about 0.7 mol % $CeO_2$, up to about 0.5 mol % $As_2O_3$, and/or up to about 0.5 mol % $Sb_2O_3$. In other embodiments, at least one fining agent may comprise up to about 0.2 mol % $SnO_2$.

A small amount of $ZrO_2$ may also also be introduced by contact of hot glass with zirconia-based refractory materials in the melter, and thus monitoring its level in the glass may be important to judging the rate of tank wear over time. The glass, may in some embodiments, include up to about 0.1 mol % $ZrO_2$. The glass may further comprise low concentrations of $Fe_2O_3$, as this material is a common impurity in batch materials. In some embodiments, the glass may include up to about 0.5 mol % $Fe_2O_3$ and, in other embodiments, up to about 0.2 mol % $Fe_2O_3$.

TABLE 1

Exemplary compositions of glasses.

mol %

| | 1 | 2 | 3 | 4 | 5 | 6 |
|---|---|---|---|---|---|---|
| $SiO_2$ | 67.11 | 65.75 | 65.82 | 65.79 | 65.81 | 65.63 |
| $Al_2O_3$ | 9.90 | 9.49 | 9.46 | 9.41 | 9.39 | 9.36 |
| $B_2O_3$ | 13.30 | 15.44 | 15.43 | 15.60 | 15.65 | 15.94 |
| $Na_2O$ | 0.04 | 0.04 | 0.04 | 0.04 | 0.04 | 0.04 |
| $K_2O$ | 0.02 | 0.02 | 0.02 | 0.02 | 0.02 | 0.01 |
| MgO | 0.39 | 0.39 | 0.39 | 0.39 | 0.21 | 0.19 |
| CaO | 8.92 | 8.72 | 8.73 | 8.66 | 8.75 | 8.64 |
| SrO | 0.21 | 0.07 | 0.02 | 0.01 | 0.01 | 0.01 |
| BaO | 0.00 | 0.00 | 0.00 | 0.00 | 0.00 | 0.00 |
| $SnO_2$ | 0.07 | 0.05 | 0.05 | 0.05 | 0.08 | 0.11 |
| $ZrO_2$ | 0.03 | 0.02 | 0.03 | 0.03 | 0.03 | 0.05 |
| $Fe_2O_3$ | 0.01 | 0.01 | 0.01 | 0.01 | 0.01 | 0.01 |
| Total | 100.00 | 100.00 | 100.00 | 100.00 | 100.00 | 100.00 |

| | 7 | 8 | 9 | 10 | 11 | 12 |
|---|---|---|---|---|---|---|
| $SiO_2$ | 66.14 | 66.35 | 66.59 | 66.45 | 67.24 | 67.51 |
| $Al_2O_3$ | 9.17 | 8.81 | 8.38 | 8.01 | 7.66 | 7.45 |
| $B_2O_3$ | 15.81 | 16.27 | 16.90 | 17.72 | 17.60 | 17.87 |
| $Na_2O$ | 0.04 | 0.04 | 0.04 | 0.04 | 0.04 | 0.04 |
| $K_2O$ | 0.02 | 0.01 | 0.01 | 0.01 | 0.01 | 0.01 |
| MgO | 0.19 | 0.18 | 0.17 | 0.17 | 0.15 | 0.00 |
| CaO | 8.47 | 8.17 | 7.75 | 7.39 | 7.07 | 6.90 |
| SrO | 0.01 | 0.01 | 0.01 | 0.01 | 0.01 | 0.01 |
| BaO | 0.00 | 0.00 | 0.00 | 0.00 | 0.00 | 0.00 |
| $SnO_2$ | 0.10 | 0.10 | 0.09 | 0.12 | 0.12 | 0.11 |
| $ZrO_2$ | 0.04 | 0.05 | 0.04 | 0.07 | 0.08 | 0.08 |
| $Fe_2O_3$ | 0.01 | 0.01 | 0.01 | 0.01 | 0.01 | 0.01 |
| Total | 100.00 | 100.00 | 100.00 | 100.00 | 100.00 | 100.00 |

| | 13 | 14 | 15 | 16 | 17 | 18 |
|---|---|---|---|---|---|---|
| $SiO_2$ | 67.54 | 67.48 | 67.41 | 66.80 | 67.49 | 67.38 |
| $Al_2O_3$ | 7.32 | 7.27 | 7.27 | 7.20 | 7.23 | 7.22 |
| $B_2O_3$ | 17.94 | 18.11 | 18.17 | 18.94 | 18.19 | 18.29 |
| $Na_2O$ | 0.04 | 0.04 | 0.04 | 0.04 | 0.04 | 0.04 |
| $K_2O$ | 0.01 | 0.01 | 0.01 | 0.01 | 0.01 | 0.01 |
| MgO | 0.15 | 0.15 | 0.15 | 0.15 | 0.15 | 0.15 |
| CaO | 6.79 | 6.75 | 6.76 | 6.67 | 6.71 | 6.73 |
| SrO | 0.01 | 0.01 | 0.01 | 0.01 | 0.01 | 0.01 |
| BaO | 0.00 | 0.00 | 0.00 | 0.00 | 0.00 | 0.00 |
| $SnO_2$ | 0.10 | 0.10 | 0.10 | 0.09 | 0.09 | 0.09 |
| $ZrO_2$ | 0.08 | 0.06 | 0.06 | 0.07 | 0.06 | 0.06 |
| $Fe_2O_3$ | 0.01 | 0.01 | 0.01 | 0.01 | 0.01 | 0.01 |
| Total | 100.00 | 100.00 | 100.00 | 100.00 | 100.00 | 100.00 |

| | 19 | 20 | 21 | 22 | 23 | 24 |
|---|---|---|---|---|---|---|
| $SiO_2$ | 66.56 | 64.20 | 61.34 | 59.18 | 60.52 | 60.66 |
| $Al_2O_3$ | 7.39 | 7.46 | 8.17 | 8.08 | 8.25 | 8.24 |
| $B_2O_3$ | 18.75 | 20.87 | 22.04 | 24.39 | 22.71 | 22.60 |
| $Na_2O$ | 0.04 | 0.04 | 0.04 | 0.04 | 0.04 | 0.04 |
| $K_2O$ | 0.01 | 0.01 | 0.01 | 0.01 | 0.01 | 0.01 |
| MgO | 0.16 | 0.15 | 0.17 | 0.17 | 0.18 | 0.18 |
| CaO | 6.91 | 7.06 | 7.92 | 7.90 | 8.07 | 8.04 |
| SrO | 0.01 | 0.01 | 0.01 | 0.01 | 0.01 | 0.01 |
| BaO | 0.00 | 0.00 | 0.00 | 0.00 | 0.00 | 0.00 |
| $SnO_2$ | 0.10 | 0.11 | 0.17 | 0.13 | 0.12 | 0.12 |

TABLE 1-continued

Exemplary compositions of glasses.

mol %

| | | | | | | |
|---|---|---|---|---|---|---|
| $ZrO_2$ | 0.06 | 0.07 | 0.11 | 0.07 | 0.07 | 0.08 |
| $Fe_2O_3$ | 0.01 | 0.01 | 0.01 | 0.01 | 0.01 | 0.01 |
| Total | 100.00 | 100.00 | 100.00 | 100.00 | 100.00 | 100.00 |

| | 25 | 26 | 27 | 28 | 29 | 30 |
|---|---|---|---|---|---|---|
| $SiO_2$ | 58.20 | 60.20 | 60.27 | 58.75 | 60.33 | 60.32 |
| $Al_2O_3$ | 8.53 | 8.12 | 8.08 | 7.87 | 8.09 | 8.07 |
| $B_2O_3$ | 24.88 | 23.24 | 23.30 | 25.21 | 23.19 | 23.22 |
| $Na_2O$ | 0.04 | 0.04 | 0.04 | 0.03 | 0.03 | 0.03 |
| $K_2O$ | 0.01 | 0.02 | 0.01 | 0.01 | 0.01 | 0.01 |
| MgO | 0.26 | 0.30 | 1.95 | 2.55 | 3.04 | 3.16 |
| CaO | 7.89 | 7.77 | 6.14 | 5.36 | 5.08 | 4.96 |
| SrO | 0.01 | 0.01 | 0.01 | 0.01 | 0.01 | 0.01 |
| BaO | 0.00 | 0.00 | 0.00 | 0.00 | 0.00 | 0.00 |
| $SnO_2$ | 0.11 | 0.16 | 0.11 | 0.11 | 0.12 | 0.12 |
| $ZrO_2$ | 0.07 | 0.12 | 0.08 | 0.08 | 0.09 | 0.09 |
| $Fe_2O_3$ | 0.01 | 0.01 | 0.01 | 0.01 | 0.01 | 0.01 |
| Total | 100.00 | 100.00 | 100.00 | 100.00 | 100.00 | 100.00 |

| | 31 | 32 | 33 | 34 | 35 | 36 |
|---|---|---|---|---|---|---|
| $SiO_2$ | 58.80 | 60.59 | 60.69 | 61.01 | 60.98 | 59.86 |
| $Al_2O_3$ | 7.89 | 8.16 | 8.24 | 8.27 | 8.29 | 8.12 |
| $B_2O_3$ | 25.23 | 23.43 | 23.85 | 23.85 | 23.96 | 25.52 |
| $Na_2O$ | 0.03 | 0.03 | 0.04 | 0.04 | 0.04 | 0.05 |
| $K_2O$ | 0.01 | 0.01 | 0.01 | 0.01 | 0.01 | 0.01 |
| MgO | 3.19 | 3.44 | 3.67 | 3.84 | 3.89 | 3.84 |
| CaO | 4.64 | 4.09 | 3.26 | 2.72 | 2.56 | 2.34 |
| SrO | 0.01 | 0.01 | 0.01 | 0.01 | 0.01 | 0.01 |
| BaO | 0.00 | 0.00 | 0.00 | 0.00 | 0.00 | 0.00 |
| $SnO_2$ | 0.11 | 0.12 | 0.11 | 0.13 | 0.13 | 0.12 |
| $ZrO_2$ | 0.10 | 0.10 | 0.10 | 0.11 | 0.12 | 0.12 |
| $Fe_2O_3$ | 0.01 | 0.01 | 0.01 | 0.01 | 0.01 | 0.01 |
| Total | 100.00 | 100.00 | 100.00 | 100.00 | 100.00 | 100.00 |

| | 31 | 32 | 33 | 34 | 35 | 36 |
|---|---|---|---|---|---|---|
| $SiO_2$ | 58.80 | 60.59 | 60.69 | 61.01 | 60.98 | 59.86 |
| $Al_2O_3$ | 7.89 | 8.16 | 8.24 | 8.27 | 8.29 | 8.12 |
| $B_2O_3$ | 25.23 | 23.43 | 23.85 | 23.85 | 23.96 | 25.52 |
| $Na_2O$ | 0.03 | 0.03 | 0.04 | 0.04 | 0.04 | 0.05 |
| $K_2O$ | 0.01 | 0.01 | 0.01 | 0.01 | 0.01 | 0.01 |
| MgO | 3.19 | 3.44 | 3.67 | 3.84 | 3.89 | 3.84 |
| CaO | 4.64 | 4.09 | 3.26 | 2.72 | 2.56 | 2.34 |
| SrO | 0.01 | 0.01 | 0.01 | 0.01 | 0.01 | 0.01 |
| BaO | 0.00 | 0.00 | 0.00 | 0.00 | 0.00 | 0.00 |
| $SnO_2$ | 0.11 | 0.12 | 0.11 | 0.13 | 0.13 | 0.12 |
| $ZrO_2$ | 0.10 | 0.10 | 0.10 | 0.11 | 0.12 | 0.12 |
| $Fe_2O_3$ | 0.01 | 0.01 | 0.01 | 0.01 | 0.01 | 0.01 |
| Total | 100.00 | 100.00 | 100.00 | 100.00 | 100.00 | 100.00 |

The high amount of boron present provides the glass with a high level of intrinsic or "native" scratch resistance without chemical strengthening by ion exchange. Scratch resistance is determined by Knoop scratch threshold testing. In Knoop threshold testing, a mechanical tester holds a Knoop diamond in which a glass is scratched at increasing loads to determine the onset of lateral cracking; i.e., sustained cracks that are greater than twice the width of the original scratch/groove. This onset of lateral cracking is defined as the "Knoop Scratch Threshold." The glasses described herein have a minimum Knoop scratch threshold of about 15 N (Newtons). In some embodiments, the Knoop scratch threshold is at least 20 N and, in other embodiments, at least about 25 N.

Photographs of Knoop scratch test results for glass sample 25 in Table 1 are shown in FIGS. 2A-2F. The glass was not ion exchanged prior to testing. At loads of up to 26 N (FIGS. 2A-2D), no lateral cracking associated with the original scratch 200 is observed. Lateral cracking 202 is observed at a load of 28 N (FIG. 2E), but the degree of lateral cracking 212 is less than twice the width of the original scratch 202. The Knoop Scratch Threshold for the glass is reached at a load of 30 N (FIG. 2F), as the lateral observed cracking 214 is greater than twice the width of the original scratch 204.

In comparison to the glasses described herein, other alkaline earth borosilicate glasses (Eagle XG® Glass, manufactured by Corning Incorporated) exhibit a Knoop Scratch Threshold of 8-10 N, and ion exchanged alkali aluminosilicate glasses (Gorilla® Glass and Gorilla® Glass 3, manufactured by Corning Incorporated) exhibit Knoop Scratch Thresholds of 3.9-4.9 N and 9.8-12 N. respectively.

A method of making the glasses described herein is also provided the method includes providing a glass melt comprising $SiO_2$, $B_2O_3$, and at least one of $Al_2O_3$ and $P_2O_5$, wherein the glass melt is substantially free of alkali metal oxide modifiers, and down-drawing the glass melt to form the glass. In some embodiments, the step of down-drawing the glass comprises slot-drawing the glass melt and, in other embodiments, fusion-drawing the glass melt.

In certain embodiments, the method further includes providing a core glass melt and fusion drawing the core glass melt to form a core glass having a coefficient of thermal expansion that is less than the coefficient of thermal expansion of the clad glass. The clad glass melt is then fusion drawn to form the clad glass layer, thereby surrounding the core glass. The clad glass layer is under a compressive stress of at least about 40 MPa and, in some embodiments, at least about 80 MPa.

Being substantially free of alkali metals, the glasses described herein are suitable for use in thin film transistor (TFT) display applications. These applications require an alkali-doped and alkali-free interface, since the presence of alkali ions poisons the thin film transistors. Thus, ion exchanged alkali-containing glasses are unsuitable for such applications. Glass laminates that employ the alkali-doped and alkali-free glasses described herein as a clad layer provide a strengthened glass product combined with an interface that is either alkali-doped and alkali-free or doped with a low level (<1 mol %) alkali metals or alkali metal oxides. In some embodiments, the alkali-doped and alkali-free glasses also have high annealing and strain points to reduce thermal compaction, which is desirable for TFT display substrates. The glasses described herein may also be used in color filter substrates, cover glasses, or touch interfaces in various electronic devices.

While typical embodiments have been set forth for the purpose of illustration, the foregoing description should not be deemed to be a limitation on the scope of the disclosure or appended claims. Accordingly, various modifications, adaptations, and alternatives may occur to one skilled in the art without departing from the spirit and scope of the present disclosure or appended claims.

The invention claimed is:

1. A glass, the glass comprising:
   about 50 mol % to about 70 mol % $SiO_2$;
   about 6 mol % to about 10 mol % $Al_2O_3$;
   about 18 mol % to about 30 mol % $B_2O_3$;
   up to about 5 mol % MgO;
   up to about 10 mol % CaO;
   up to about 5 mol % SrO; and
   0.01 mol % to about 0.5 mol % $Fe_2O_3$,
   wherein MgO+CaO+SrO≤$Al_2O_3$, and a sum of alkali metal oxide modifiers is less than or equal to about 1 mol %.

2. The glass of claim 1, wherein 4 mol %≤MgO+CaO+SrO≤$Al_2O_3$.

3. The glass of claim 1, wherein the glass has a Young's modulus of less than about 65 GPa.

4. The glass of claim 3, wherein the Young's modulus is less than about 60 GPa.

5. The glass of claim 1, wherein the glass has a coefficient of thermal expansion of less than about $40 \times 10^{-7}/°$ C.

6. The glass of claim 5, wherein the coefficient of thermal expansion is less than about $35 \times 10^{-7}/°$ C.

7. The glass of claim 1, wherein the glass further comprises at least one of $SnO_2$, $CeO_2$, $As_2O_3$, $Sb_2O_5$, $Cl^-$, and $F^-$.

8. The glass of claim 1, wherein the glass comprises at least one of:
   up to about 0.7 mol % $SnO_2$;
   up to about 0.7 mol % $CeO_2$;
   up to about 0.5 mol % $As_2O_3$; and
   up to about 0.5 mol % $Sb_2O_3$.

9. The glass of claim 1, wherein the glass comprises:
   about 55 mol % to about 70 mol % $SiO_2$;
   greater than 6 mol % to about 10 mol % $Al_2O_3$;
   about 18 mol % to about 30 mol % $B_2O_3$;
   up to about 3 mol % MgO;
   up to about 10 mol % CaO; and
   up to about 3 mol % SrO.

10. The glass of claim 9, wherein the glass comprises up to about 0.2 mol % $SnO_2$.

11. The glass of claim 10, wherein the glass forms a clad layer in a glass laminate, the glass laminate comprising a core glass and having a coefficient of thermal expansion that is greater than a coefficient of thermal expansion of the clad layer.

12. The glass of claim 11, wherein the clad layer is under a compressive stress of at least about 40 MPa.

13. The glass of claim 1, wherein the glass has a liquidus viscosity of at least 100 kpoise.

14. The glass of claim 1, wherein the glass is down-drawable.

15. The glass of claim 1, wherein the glass comprises up to about 0.1 mol % $ZrO_2$.

16. The glass of claim 1, wherein the glass is free of alkali metal oxide modifiers.

17. The glass of claim 1, wherein the glass has a Knoop scratch threshold of at least 15 N.

18. The glass of claim 17, wherein the glass has a Knoop scratch threshold of at least 20 N.

19. The glass of claim 1, wherein the glass forms at least a portion of a color filter substrate, a thin film transistor substrate, a cover glass, or a touch interface.

20. The glass of claim 1, wherein the glass comprises 0 mol % BaO.

* * * * *